United States Patent
Duffy et al.

(10) Patent No.: US 12,482,239 B2
(45) Date of Patent: Nov. 25, 2025

(54) SELF-SUPERVISED LEARNING FOR MEDICAL IMAGE QUALITY CONTROL

(71) Applicant: Subtle Medical, Inc., Menlo Park, CA (US)

(72) Inventors: Ben Andrew Duffy, Palo Alto, CA (US); Gajanana Keshava Datta, Los Altos, CA (US); Enhao Gong, Sunnyvale, CA (US)

(73) Assignee: Subtle Medical, Inc., Menlo Park, CA (US)

( * ) Notice: Subject to any disclaimer, the term of this patent is extended or adjusted under 35 U.S.C. 154(b) by 338 days.

(21) Appl. No.: 18/298,524

(22) Filed: Apr. 11, 2023

(65) Prior Publication Data
US 2023/0386184 A1    Nov. 30, 2023

Related U.S. Application Data

(60) Provisional application No. 63/330,401, filed on Apr. 13, 2022.

(51) Int. Cl.
*G06V 10/774*    (2022.01)
*G06T 7/00*    (2017.01)
*G06V 10/82*    (2022.01)

(52) U.S. Cl.
CPC ........ *G06V 10/7753* (2022.01); *G06T 7/0012* (2013.01); *G06V 10/82* (2022.01); *G06T 2207/10072* (2013.01); *G06V 2201/03* (2022.01)

(58) Field of Classification Search
CPC ............... G06V 10/7753; G06V 10/82; G06V 2201/03; G06T 7/0012; G06T 2207/10072; G06T 2207/10132; G06T 2207/20081; G06T 2207/20084; G06T 2207/30016; G06T 2207/30168; G06N 3/044; G06N 3/0455; G06N 3/0464; G06N 3/048; G06N 3/0499; G06N 3/082; G06N 3/0895; G06N 3/09; G06N 3/088; G16H 30/20; G16H 30/40; G16H 50/20; G16H 50/70

See application file for complete search history.

(56) References Cited

U.S. PATENT DOCUMENTS

| | | | |
|---|---|---|---|
| 2021/0056412 A1 | 2/2021 | Jung | |
| 2021/0279868 A1 | 9/2021 | Ma et al. | |
| 2022/0114733 A1* | 4/2022 | Feng | .......... G06T 7/11 |
| 2023/0074706 A1* | 3/2023 | Xiao | ................. G06V 30/1444 |

FOREIGN PATENT DOCUMENTS

| | | | |
|---|---|---|---|
| WO | WO-2021041125 A1 | 3/2021 | |
| WO | WO-2023200772 A1 | 10/2023 | |

OTHER PUBLICATIONS

MedAug, Vu et al 2012 (Year: 2012).*

(Continued)

*Primary Examiner* — Jianxun Yang
(74) *Attorney, Agent, or Firm* — Wilson Sonsini Goodrich & Rosati

(57) ABSTRACT

Provided herein are methods for automated image quality control (QC). The method comprises: generating training data based at least in part on metadata obtained from a data augmentation process; training a model for a QC task based at least in part on the training data. The model is trained using a self-supervised learning algorithm.

11 Claims, 10 Drawing Sheets

(56) References Cited

OTHER PUBLICATIONS

DICOM metadata, Hu et al 2020 (Year: 2020).*
Duffy et al. Retrospective correction of motion artifact affected structural MRI images using deep learning of simulated motion. 1st Conference on Medical Imaging with Deep Learning (MIDL 2018), Amsterdam, The Netherlands. 8 pages.
Hu et al. Self-Supervised Pretraining with DICOM Metadata in Ultrasound Imaging. Proceedings of Machine Learning Research 1-17, 2020.
IXI Dataset. Retrieved from the internet on Aug. 25, 2023 at: https://brain-development.org/ixi-dataset/. 2 pages.
PCT/US2023/018141 International Search Report and Written Opinion dated Jun. 29, 2023.
Selvaraju et al. Grad-CAM: Visual Explanations from Deep Networks via Gradient-based Localization. In Proceedings of the IEEE International Conference on Computer Vision 2017 (pp. 618-626).
Vu et al. MedAug: Contrastive learning leveraging patient metadata improves representations for chest X-ray interpretation. Proceedings of Machine Learning Research 126:1-14. 2021.
Webpage: Openneuro.org. Retrieved from the internet on Aug. 25, 2023. 9 pages.
Yun et al. CutMix: Regularization Strategy to Train Strong Classifiers with Localizable Features. In Proceedings of the IEEE/CVF International Conference on Computer Vision 2019 (pp. 6023-6032).

* cited by examiner

SELF-SUPERVISED LEARNING FOR MEDICAL IMAGE QUALITY CONTROL

CROSS-REFERENCE TO RELATED APPLICATION

This application claims priority to U.S. Provisional Application No. 63/330,401 filed on Apr. 13, 2022, the content of which is incorporated herein in its entirety.

BACKGROUND

Medical imaging plays vital role in health care. Quality control (QC) of such medical images is an important safeguard against erroneous diagnoses in the clinic. QC is also an essential first step in most research studies. In some cases, an image quality may be degraded, and the images may be contaminated with noise due to various factors such as physical limitation of the electronic devices, dynamic range limit, noise from the environment and the movement artifacts due to movement of patient during imaging. For example, subject motion during MRI acquisition may limit the diagnostic capacity of the images or lead to necessary rescans. However, manual QC can be extremely laborious and highly subjective. For instance, image quality control may suffer from class imbalance as most data meets quality standards. The imbalanced class (e.g., majority class is the data meets quality standards and minority class is the data fails the quality standard) may lead to the model capable of making predictions with high accuracy by predicting the majority class, but failed to capture the minority class. To fix the imbalanced class, users may be required to label data (to provide sufficient data to the minority class) which is a labor intensive and expensive process.

SUMMARY

A need exists for a fully automated quality control system for deep learning models. Methods and systems are provided for automating medical imaging quality control. Methods and systems provided herein may provide an automated framework that employs machine learning or artificial intelligence techniques for the quality of control of medical imaging. In particular, the present disclosure provides a robust quality control system with automated quality control framework that alleviates the manual labelling burden in quality control, while beneficially improving reliability and patient care.

The provided methods and systems may utilize or apply deep learning techniques to improve the efficiency and accuracy of a process that is designed to enhance image quality (e.g., mitigate imaging artifacts and removing various types of noise). For example, a fully automated artifact detection software using deep learning can be used to enable fast and accurate detection of motion artifact affected T1-weighted structural Magnetic Resonance imaging (MRI) images. The automation methods and framework can beneficially be applied to any type of imaging modalities, imaging processes that employ deep learning techniques to mitigate artifacts. Examples of artifacts in medical imaging may include noise (e.g., low signal noise ratio), blur (e.g., motion artifact), shading (e.g., blockage or interference with sensing), missing information (e.g., missing pixels or voxels in painting due to removal of information or masking), and/or reconstruction (e.g., degradation in the measurement domain). The automation methods and framework can beneficially be applied to any type of imaging modalities including, but not limited to, Positron Emission Tomography (PET), Magnetic Resonance Imaging (MM), ultrasound imaging, X-ray imaging, Computed Tomography (CT), ultrasound, other modalities or a combination of these modalities. Additionally, methods and systems of the disclosure may be applied to existing systems without a need of a change of the underlying infrastructure.

In one aspect, a computer-implemented method for automated image quality control (QC) is provided. The method for automated image quality control (QC) comprises: generating training data based at least in part on metadata obtained from a data augmentation process; training a model for a QC task based at least in part on the training data. The model is trained using a self-supervised learning algorithm.

In a related yet separated aspect, the present disclosure provides non-transitory computer-readable storage medium including instructions that, when executed by one or more processors, cause the one or more processors to perform operations comprising: generating training data based at least in part on metadata obtained from a data augmentation process; and training a model for a QC task based at least in part on the training data, where the model is trained using a self-supervised learning algorithm.

In some embodiments, the supervised learning algorithm is contrastive learning. In some embodiments, the metadata is extracted from a header of an image. In some cases, the metadata is used to generate a label for the image.

In some embodiments, the QC task is image registration quality control. In some cases, the model is trained to predict an alignment based on a similarity map between embeddings of two input images. In some instances, the embeddings are local embeddings or global embeddings produced by an encoder-decoder network.

In some embodiments, the QC task is out-of-distribution (OOD) detection. In some cases, the model is trained to predict metadata from an input image and wherein an OOD event is determined when the predicted metadata does not match the metadata. In some cases, the model is trained to predict metadata from an input image and wherein an OOD event is detected when an uncertainty score of the metadata prediction is beyond a predetermined threshold.

In some embodiments, the training data comprises 3D image including a stack of slices. In some cases, the method further comprises generating a label for the 3D image using a multiple-instance-learning method. For instance, the method further comprises determining a pooling strategy for combining embeddings of one or more slices based on a selected multiple-instance-learning assumption.

In some embodiments, the data augmentation comprises generating cropped patch with simulated artifact. In some cases, the method further comprises replacing a corresponding patch in an input image with the cropped patch with the simulated artifact.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and descriptions are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

Figure 1:
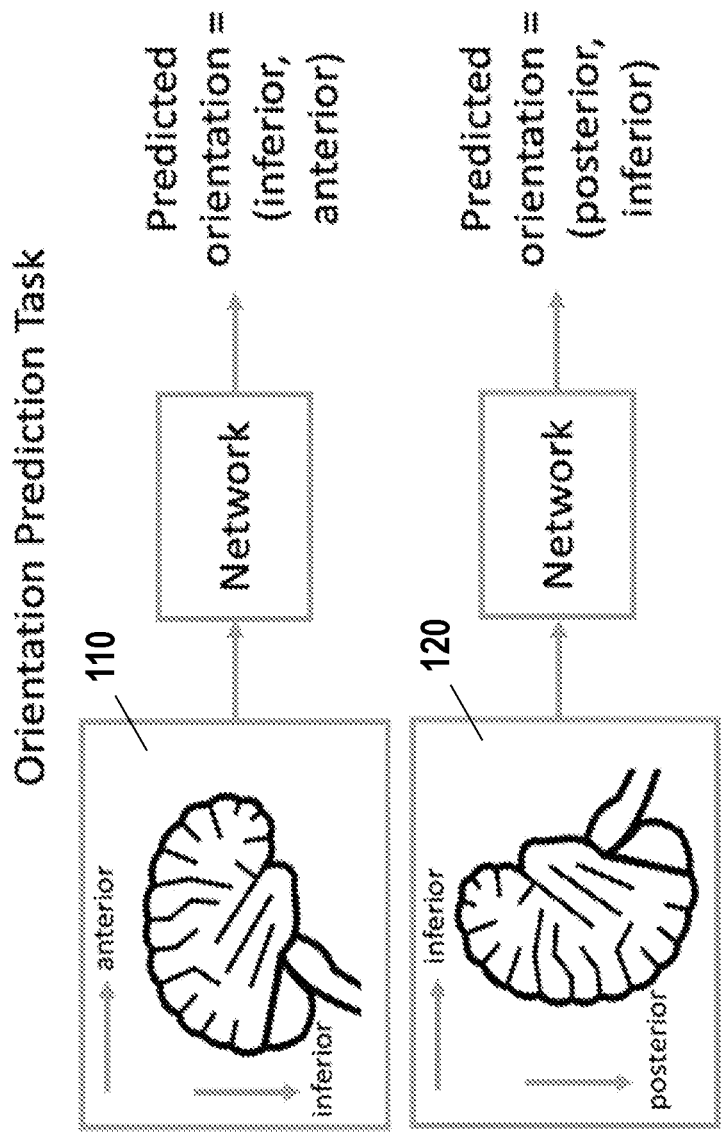
FIG. 1 shows an example of an orientation prediction task, in accordance with some embodiments of the disclosure.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

The present disclosure provides systems and methods that are capable of automating the process of medical image quality enhancement or artifacts detection. In particular, the provided systems and methods may provide an automated image quality control framework that can improve the accuracy and efficiency of image quality control. The image quality control (QC) framework may automatically control medical images qualities without human intervention or with reduced human intervention. The image QC framework may comprise machine learning or artificial intelligence.

The provided automated image quality control framework may be applied in improving image quality or artifacts detection in various aspects. In some embodiments, the image quality control system herein may be capable of performing accurate image quality estimation, registration quality estimation, artifacts detection, low quality image detection, out-of-distribution (00D) image detection, automatic control of imaging device based on real-time feedback information about artifacts detection and various other functions. Examples of low quality in medical imaging may include noise (e.g., low signal noise ratio), blur (e.g., motion artifact), shading (e.g., blockage or interference with sensing), missing information (e.g., missing pixels or voxels in painting due to removal of information or masking), reconstruction (e.g., degradation in the measurement domain), and/or under-sampling artifacts (e.g., under-sampling due to compressed sensing, aliasing).

The presently described approach may be employed on data acquired by a variety types of imaging devices (e.g., tomographic scanners). Though magnetic resonance imaging (MRI) examples are described later herein, it should be understood that the present approach can be used in any imaging modality contexts. For instance, the presently described approach may be employed on data acquired by any types of scanners (e.g., tomographic scanners) including, but not limited to, computed tomography (CT), single photon emission computed tomography (SPECT) scanners, functional magnetic resonance imaging (fMRI), or Positron Emission Tomography (PET) or other imaging modalities. In some cases, different imaging modalities may suffer from different types of degraded image qualities. For instance, in MRI, multiple pulse sequences (also known as image contrast) are usually acquired. However, subject motion during MRI acquisition can limit the diagnostic capacity of the images or lead to necessary rescans. The automated image quality control system as described herein can also be easily applied in MM to enhance the image quality and perform real-time artifact detection.

The methods and systems herein may be model agnostic. In some cases, the methods and systems can be applied regardless of the types or resources of image quality degradation. For instance, the provided methods and systems can automate any image quality control process without being limited to the sources of image quality degradation, or the specific deep learning models for downstream image processing.

Methods and systems herein may provide an automated image quality framework. In some embodiments, the automated image quality framework may comprise a mechanism to determine whether medical imaging data meet a predetermined (e.g., satisfactory) quality, a mechanism for controlling the quality of image registration (e.g., alignment), a feature (e.g., OOD detection) that prevents the return of unexpected or unacceptable outputs from the image data processing system due to uncertainty estimations generated by the automated image quality control system, a mechanism enabling an imaging device (e.g., scanner) specific, site-specific, user-specific, or task-specific calibration of the quality control procedure, and/or a feature of real-time feedback control of the scanner based on the real-time image quality information.

Multiple-Instance and Self-Supervised Learning for Label Efficient Quality Control A challenge for machine learning in medical imaging comprises obtaining sufficient high-quality labelled data for supervised training. Training effective deep learning models may require large quantities of labelled data. The labelling process may be labor intensive and expensive, particularly for tasks with highly imbalanced classes (e.g., data comprises too many data points of class A, and not enough data points of class B). Provided herein are systems and methods that may alleviate the labelling burden in the context of QC tasks.

In some embodiments, systems and methods provided herein to alleviate the labelling burden may adopt self-supervised learning, a weak labelling approach (e.g., multiple-instance learning (MIL)), or a combination of both. The use of self-supervised learning may further solve additional QC tasks, such as, but not limited to co-registration (image alignment) quality control, out-of-distribution (OOD) detection, or a combination thereof. For instance, it can be difficult to distinguish between anomalous (e.g., out-of-distribution (OOD) image) and in-distribution examples. The image quality control system herein may be capable of distinguishing OOD input images from low quality images thereby improving the accuracy of quality assessment.

Self-Supervised Learning Methods

An automated image quality framework of the present disclosure may be provided by self-supervised learning methods. The self-supervised learning may comprise pre-training a model. In some cases, the pre-training may comprise pre-training the model on a task different than a target task. The task during pre-training is referred to as a pretext task. In some cases, pretraining and training may be performed at the same time.

The labels required for training the model on the pretext task may be generated automatically from the data itself without human labelling. In some cases, the data for pre-training may be generated from multiple domains. There may be insufficient data to train a model from scratch for some domains (e.g., modalities, anatomies, imaging planes, etc.). Pretraining the model on a pretext task using data from multiple domains can be used to build a representation that requires little finetuning. Pretraining the model on a pretext task using data from multiple domains can also make the model more generalizable across different domains.

As described above, self-supervised learning may help alleviate the labelling burden by reducing the number of labels needed to achieve a given level of model performance. Training the model on the pretext tasks may not require human-annotated labels. In some cases, pretext tasks may be trained using labels that are part of data generated during training. For instance, the labels may be part of the metadata generated by a data augmentation procedure. For example, during data augmentation process, metadata may be extracted from an image file which may comprise anatomy, imaging plane, position, orientation, modality (contrast), or a combination thereof. In some cases, the metadata may be selected based on the pretext task. For example, if the pretext task is to predict the orientation of an image, the orientation metadata may be selected to generate a label for the corresponding input image. In another example, if the pretext task is to predict modality or contrast of an image, the modality or contrast metadata may be selected for generating a label.

The metadata may be extracted from an image file used during the data augmentation process or the training process. In some instances, the metadata may comprise metadata extracted from the header of an image file. The extracted metadata may comprise information about the image that is substantially reliable. For example, an orientation of a medical image may generally be reliably correct in the image file header. Further, data augmentation can be used to improve performance on at least part of a pretext task (e.g., orientation prediction). For example, data augmentation may be employed to improve performance on orientation prediction by resampling the images to new orientations. In some instances, the data augmentation for new orientations of an image comprises rotating, flipping, or transposing an image, or a combination thereof, and such new orientations data may be utilized for generating labels for training process.

FIG. 1 shows an example of orientation prediction pretext task with data augmentation. The orientation of an image is predicted by a network. As shown in the example, the original input may comprise an image 110 of a brain shown at the top with an initial orientation: (inferior, anterior). During data augmentation process, the original input is augmented in the image 120, where the original input is rotated 90° to the left and the orientation is adjusted: (posterior, inferior). A network is then trained to predict the orientation of the images.

The metadata may be from the data augmentation of any other pretext task such as tasks for puzzle-solving (e.g., jigsaw puzzle) or relative path location for predicting the correct permutation of the data that has been reordered. For example, a medical image may be split into grids and randomly shuffled. A pretext task may then comprise reordering the grids such that the medical image is recovered.

In some cases, self-supervised learning method such as contrastive learning may be utilized. The contrastive learning learns an encoder to encode image patches and utilizes an autoregressive decoder to predict the future vectors with a contrastive loss. For example, in medical image processing, contrastive learning may comprise using a loss function that encourages similar elements (e.g., anatomical regions) to be close in representation space, or encourages dissimilar elements to be further in representation space. In another example, a contrastive learning strategy may consider different views of the same patient data to be positive pairs and are therefore encouraged to be closer in representation space.

In some cases, contrastive learning may leverage metadata to encourage images with similar metadata to have similar representations. Depending on the specific task, the metadata utilized may comprise, patient data or study data, such as but not limited to, demographical information, duration, treatment type, assessment type, symptoms, severity, patient history, anatomical region, modality or any combination thereof. Metadata may further comprise those metadata extracted from data augmentation as previously provided herein.

Co-Registration Quality Control Using Contrastive Self-Supervised Learning

In some cases, the automated image quality framework or system may comprise a component for determining a quality of the registration. For example, the component may be a registration quality estimation component. In some cases, multiple images (e.g., with different contrast, dose, acquisition speed, etc.) may be acquired from the same subject and a registration algorithm such as nonlinear or affine co-registration algorithm may be applied to align the images. The registration quality estimation component may evaluate how well the registration algorithm adopted by the image data processing system has been able to align different images acquired from the same subject.

As image registration is a crucial step that can affect the result of post-processing, the registration quality estimation component may beneficially ensure that the registration result meets a pre-determined quality thereby preventing and/or reducing unpredictable outputs. In some embodiments, the registration quality estimation component may include a machine learning algorithm trained model or classifier and the output of the mechanism may be a quantitative indicator such as a score indicative of the quality or level of the alignment, or a binary result indicating whether the quality of the alignment meet a pre-determined registration quality (e.g., acceptable or unacceptable, pass or fail, etc.). Alternatively, the registration quality estimation component may include any suitable models for determining the registration quality with or without machine learning techniques.

In some cases, a registration quality estimation component may include a neural network-based classifier. The neural network-based classifier (e.g., registration quality classifier) may be trained to assess the quality of alignment (e.g., alignment score, level of alignment, whether the level of alignment is acceptable or not) between multiple different images of the same subject (e.g., same target). The multiple different images may be images acquired using different modalities, different pulse sequences (e.g., contrast-weighted images such as T1-weighted (T1), T2-weighted (T2), proton density (PD) or Fluid Attenuation by Inversion Recovery (FLAIR), etc.), different scans with different acquisition parameters and the like and such different images may be acquired for imaging the same subject or target scene. Similarly, during a training stage, the neural network may be fed with training datasets including images with poor alignment and images with good alignment in pairs.

In some embodiments, a registration quality estimation component comprises self-supervised learning. In some cases, the self-supervised learning comprises contrastive learning. For instance, image registration (e.g., alignment) may be performed using contrastive learning. In some cases, self-supervised pixel-wise embeddings of an element (e.g., vector representations in high dimensional space) are generated by encouraging embeddings to be close in embedding space. As an example, self-supervised pixel-wise anatomical embeddings are generated by encouraging embeddings with similar characteristics such as embeddings from the same patient or the same scan to be close in the embedding space. In some cases, the embeddings may be from different augmentations of the same scan, such as those previously described herein. Further, during training of the contrastive learning model, anatomically matched pixels can be pushed closer in embedding space and pixels from dissimilar anatomical locations can be pushed further apart using the loss function as described above.

Figure 2:
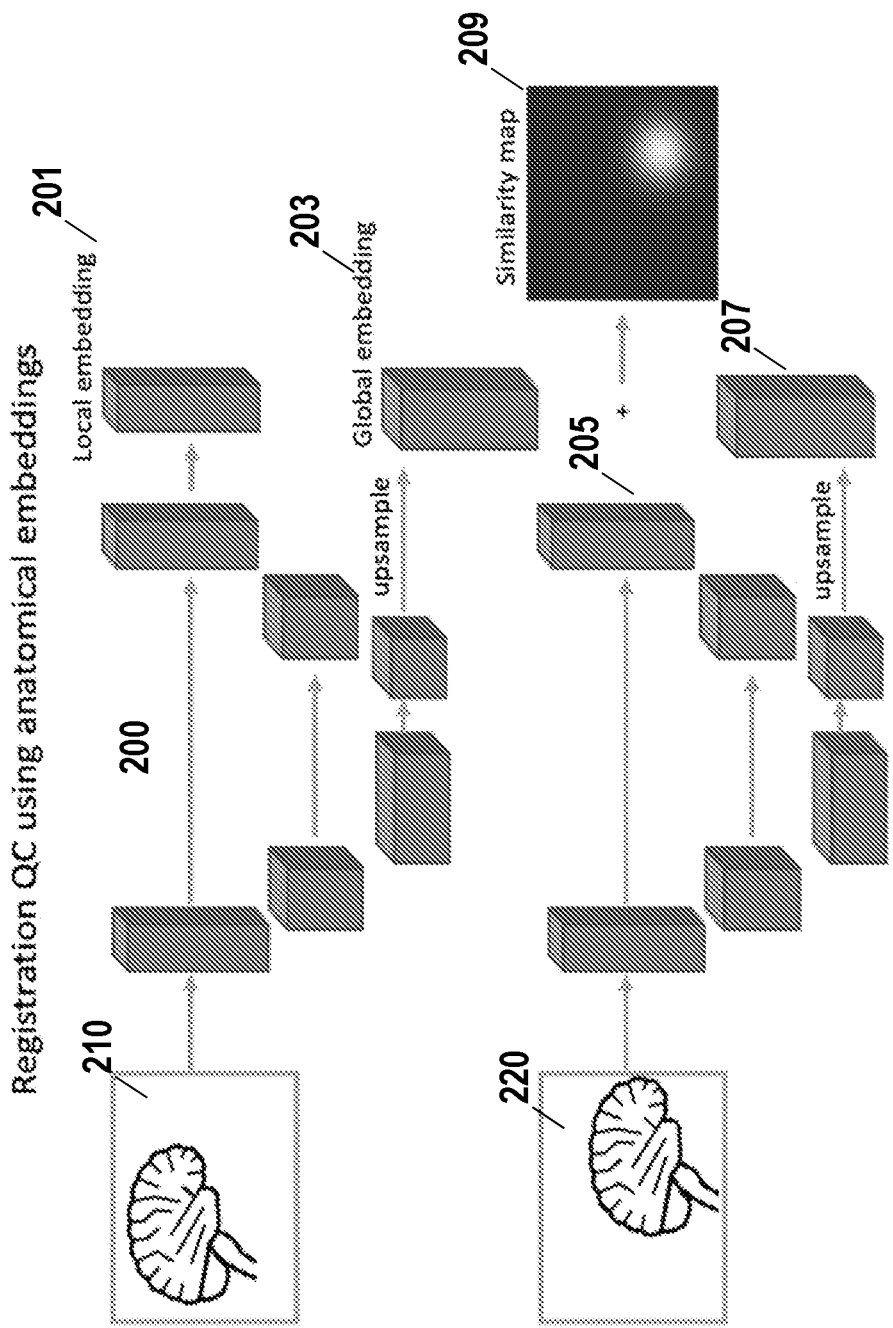
FIG. 2 shows an example of a registration quality control (QC), in accordance with embodiments of the disclosure.

In some embodiments, registration quality control may be performed by comparing the alignment of these anatomical embeddings at different scales. FIG. 2 shows an example of evaluating quality of alignment. The example illustrates evaluating global anatomical alignment using anatomical embedding such as by generating a similarity map from anatomical embeddings from input images. The registration QC may utilize anatomical embeddings from a self-supervised encoder-decoder network 200. The input images to be evaluated for registration may comprise multiple medical images 210, 220. The input medical images 210, 220 may be processed by the self-supervised encoder-decoder network and generate anatomical embeddings (e.g., a brain). The embeddings produced by the supervised encoder-decoder network may comprise local embeddings, 201, 205 and global embeddings 203, 207.

The embeddings may be compared at different scales, e.g., global scale or local scale. For instance, global anatomical alignment of the images may be evaluated by generating a similarity map between the global embeddings 203, 207. Similarly, local anatomical alignment of the images may be evaluated by generating a similarity map between the local embeddings 201, 205. The similarity map 209 may be generated by convolving the two global or local embeddings output from a network. In some cases, the network comprises one or more convolutions. In some cases, the network comprises an encoder and a decoder. In some cases, the network comprises a U-NET. In some instances, low-level features are extracted to generate a local embedding. In some instances, high-level features are extracted to generate a global embedding. If the images are misaligned, the maximum will be off-center in the similarity map. In some cases, the similarity map can indicate abnormalities in a medical image.

Out-of-Distribution Detection Using Self-Supervised Metadata Prediction

In some cases, the automated image quality framework or system may include a feature capable of identifying whether the input data to the quality control system is within or close to a distribution of the training dataset used to train the deep learning model (e.g., image quality classifier). In the case when the input data is outside of or deviated from the distribution of the training dataset, the one or more trained models of the quality control system or other post processing algorithms may produce unexpected results. This feature beneficially identifies out-of-(training)-distribution (OOD) input data or performs out-of-distribution detection. The feature may also be referred to as out-of-distribution detection (OOD) feature or OOD detection method which are used interchangeably throughout the specification. Providing such OOD feature beneficially avoids the scenario where the neural network is trusted (e.g., model is not degraded or no concept drift), but the prediction result may be unreliable due to the input image being too far from the training data distribution (e.g. the input image may contain artifacts or sequence parameters that have not been seen by the model at training time).

The out-of-distribution detection feature may include any suitable architecture or method for determining whether the input data is within the distribution of the training datasets. In some cases, the OOD detection feature further detects a low image quality. In some instances, an image quality is determined and an OOD image is detected simultaneously.

In some cases, drastic changes in input data distributions may indicate serious model degradation. The out-of-distribution (OOD) detection feature may also be capable of monitoring or tracking the difference between data used to train the model versus data that are being presented to the model to score. For instance, if the difference crosses a threshold or is drifting significantly, it may be an indicator of a model drift and degradation.

The out-of-distribution (OOD) detection feature as described herein may be used to assess the reliability of a QC prediction. If a sample is far from the training data distribution, then the prediction result cannot be relied on and may be flagged as OOD. This may mean the automatic QC system cannot be relied upon in this instance. In some embodiments, the method of assessing whether a sample is OOD comprises using a model that is trained to predict the metadata from the image. An OOD status may be detected when the metadata predicted from the image does not match the metadata in the DICOM (Digital Imaging and Communications in Medicine) header. For example, the metadata predicted from the image may indicate the tissue or body part is brain but the tags in the DICOM header is knee. The mismatch may indicate existence of out-of-distribution.

Figure 3:
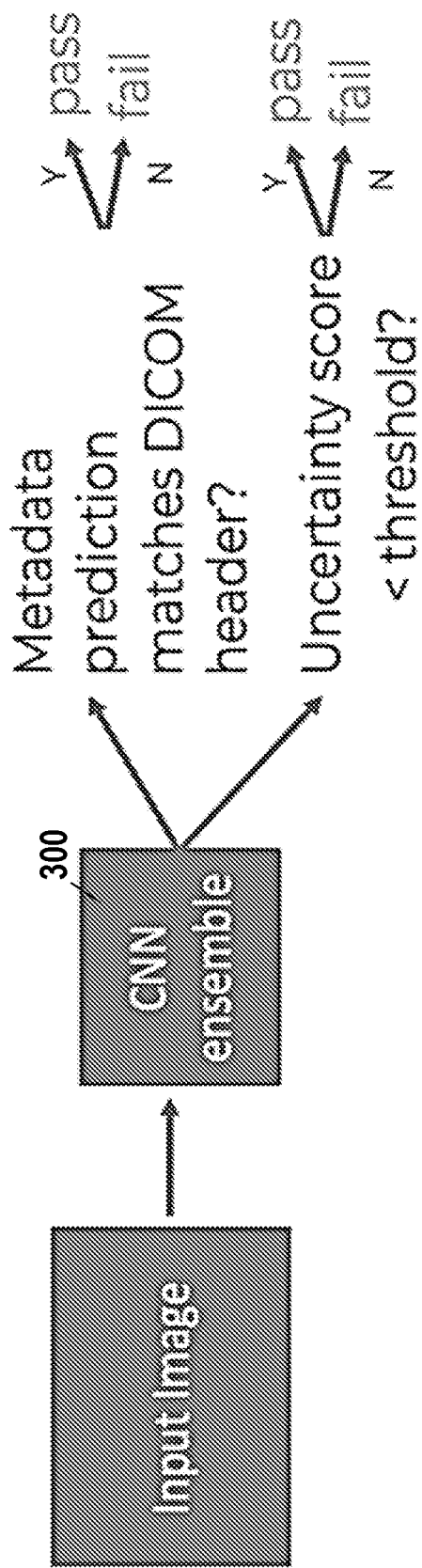
FIG. 3 shows an example of out of distribution detection, in accordance with embodiments of the disclosure.

FIG. 3 shows an exemplary method of OOD detection using metadata. The metadata may comprise, for example, anatomy, contrast, orientation, or any other metadata about an image as described herein. In some cases, a machine learning model is used to predict metadata from an image. In some instances, the machine learning model comprises a deep learning model. For example, the machine learning model may be a convolutional neural network ensemble 300, as exemplary illustrated in FIG. 3. The CNN ensemble may predict metadata from the input image. The predicted metadata may be compared with data from an image header to determine a match. For example, medical image data stored in DICOM (Digital Imaging and Communications in Medicine) format may include a DICOM header comprising image pixel data, the patient information, study descriptions, and the reported results and/or other metadata.

In some cases, the metadata utilized for determining OOD may be selected from those data that can provide meaningful information for detecting OOD. For example, different image modality such as CT, MRI or ultrasound may have their distinct metadata and different DICOM tags may be selected. The selected metadata may include, for example, voxel information (e.g., pixel spacing, Hounsfield units), study details (anatomic structure, patient orientation), patient-level data (demographics, diagnosis) or other data that may provide meaningful information for detecting OOD.

In some cases, the OOD detection may be based on a comparison result. For example, output of the comparison may be binary such as pass or fail of whether the header metadata matches the predicted metadata. In some cases, when the predicted metadata does not match the metadata, the image may be flagged as either being OOD or as having incorrect metadata.

In some cases, determining the OOD status comprises using uncertainty measures on the metadata prediction task. For instance, OOD may be detected when the uncertainty score is above a pre-determined threshold. This is because the metadata prediction task is simple (e.g., lower uncertainty in model parameters), thus lower uncertainty is likely to be associated with in-distribution data, higher uncertain is likely to be associated with out-of-distribution data. If the uncertainty score is higher than a threshold (e.g., high uncertainty), OOD is likely to exist. The uncertainty measures of the metadata prediction task can be obtained using any suitable method, for example, Monte-Carlo dropout or the variance of the predictions across multiple models (model ensembling).

Multiple-Instance Learning Methods

The automated image quality framework herein may utilize multiple-instance learning (MIL) methods. The MTh may comprise, instead of using individually labelled training instances, a group (or bag) of instances share the same label. This may be suited for QC tasks where imaging artifacts may be localized within a specific slice or region in the image, but the entire image as a whole is assigned a quality label (e.g., to reduce the labelling burden). In some examples, the entire image is a 2D image. One or more 2D images may be grouped and share the same label. In some examples, the entire image is a 3D image. A stack of slices of the 3D image may be a group i.e., 3D image and share a label. It should be noted that the grouping can be at any level. For example, multiple images from the same imaging session/scan may be grouped and assigned the same label.

In some cases, a label may be assigned to the group according to an MIL assumption. For example, in a first MIL assumption, it may be assumed that a bag (e.g., a 2D or 3D image) is positive if there is at least one positive instance (e.g., a slice of the 2D or 3D image). In other words, it may be assumed that a 3D image has unacceptable image quality if a slice of the 3D image fails a quality evaluation. The first MTh assumption may be strict as it assigns a 'fail' label to a scan or the entire 3D image if there is only a single poor quality slice. A second MTh assumption may be relaxed such that an entire 3D image may be assigned a label based on a combination of multiple images. The method herein may provide flexibly for determining the quality of the entire image by selecting/combining multiple slices of the image sharing the same label. In some cases, such configurable MTh method may be achieved by selecting different representation pooling strategy.

Figure 4:
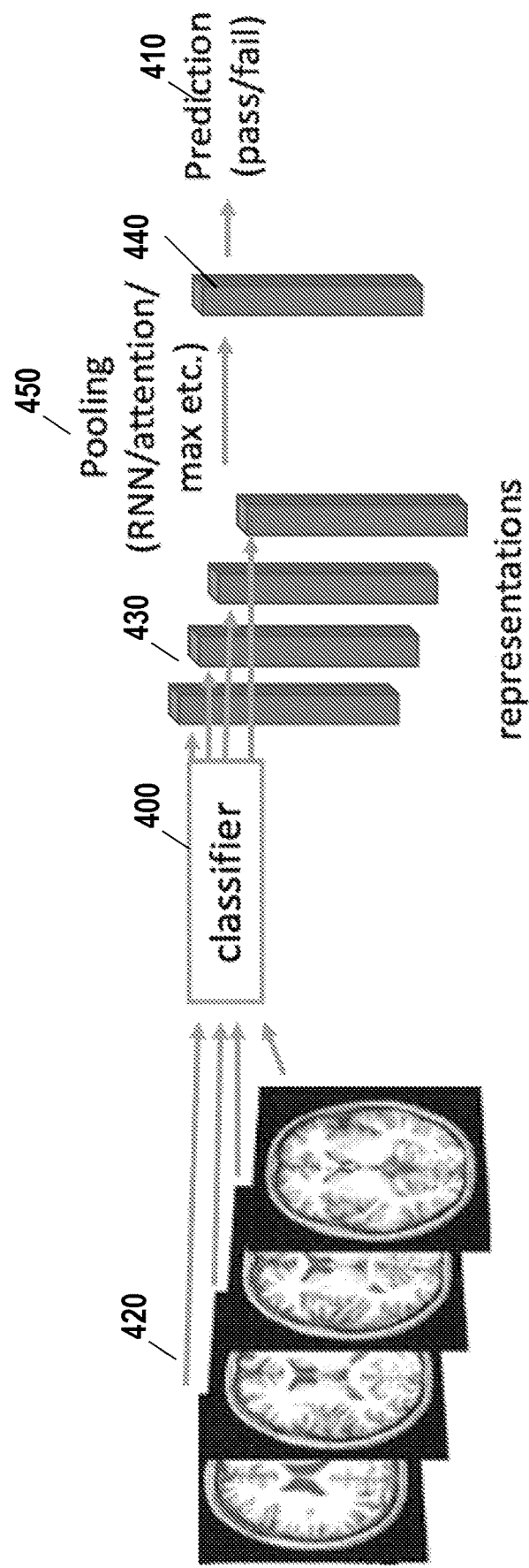
FIG. 4 shows an example of a multiple instance learning for QC, in accordance with embodiments of the disclosure.

An exemplary MTh for QC is illustrated in FIG. 4. MIL may comprise a machine learning model comprising an image quality classifier 400. The image quality classifier may output an image quality (e.g., acceptable or unacceptable, pass or fail, etc.) 410 based on one or more slices of an image 420. In some cases, the image classifier comprises one or more convolutions.

FIG. 4 shows an example of a configurable MIL method. As shown in the example, a stack of image slices 420 from a scan (of a 3D image) may be inputted to an image classifier 400 to generate representations 430. The input images may be acquired using any type of imaging modalities, such as PET, MRI, ultrasound imaging, X-ray imaging, CT, ultrasound, other modalities.

The output from the classifier comprises a representation vector 430 for each image slice 420. These representations from the image slices may be pooled to determine a combined representation 440. A pooling strategy 450 may be selected to determine how the representations (e.g., final neural network layers) for each slice are combined. In some instances, the pooling strategy may comprise max-pooling, min-pooling, average pooling, attention pooling (based on neural network layers), recurrent neural network (RNN) pooling, self-attention pooling or pooling based on transformer networks.

Different pooling strategies may be selected according to the different MTh assumption. As an example, if the assumption is that a single slice can cause the entire image to fail the quality check, then a max-pooling strategy may be adopted, where the maximum value is used across instances. As a further example, if the sequential nature of the medical image slices is important, then a pooling strategy in which the sequence is encoded may be adopted, e.g. transformer networks with sequence encoding such as by using learned sequence encodings or Fourier-based encodings.

Once the representations are pooled, a prediction 410 may be generated. In some cases, the prediction comprises a quantitative indicator such as a score indicative of the quality of the image or level of the positive instances. In some cases, the prediction comprises a binary result indicating whether the quality of the image meets a pre-determined registration quality (e.g., acceptable or unacceptable, pass or fail, etc.).

Data Augmentation Based on Cropped Patches of Simulated Artifacts (CutArt)

In some embodiments, data augmentation techniques may be utilized to improve the performance of an automated quality control system. In a training stage, the machine learning model may be fed with training datasets including images of acceptable quality (e.g., quality above a pre-determined threshold) and unacceptable quality (e.g., quality below a pre-determined threshold) in pairs. In some cases, the unacceptable quality images are built by augmenting images of acceptable quality. The machine learning model may learn to distinguish the different qualities or determine whether the quality is acceptable. Alternatively or additionally, the machine learning model may be trained to determine different quality scores.

In some cases, the training datasets may include augmented image data. For example, the poor (unacceptable) quality images may be simulated such as from high quality images or include real low-quality images. Obtaining sufficient low-quality training data can be challenging therefore accurate simulation based on the physics of image generation can be used to provide sufficient training data. Simulating low quality images using high quality images may beneficially provide large volume of training datasets thereby improving the model accuracy and performance. In some cases, the simulated poor-quality/low-quality data may be created in accordance with the physics of image generation, a mathematic model, physical deployment conditions, and other factors to ensure the accuracy of the simulated data. The output of the classifier may be a binary result indicating the image quality is acceptable or unacceptable. Alternatively or additionally, the output of the classifier may be a score indicative of different levels of image quality.

In some instances, training a deep learning based quality control system using patches of simulated artifacts beneficially improve QC classification, artifact localization performance, or a combination thereof compared to using simulated artifacts that are distributed across the entire image. Using patches from meaningful locations in the image such as the tissue of interest instead of the image background can beneficially improves the accuracy, reliability of the prediction performance. In some embodiments, the data augmentation techniques may utilize cropped patches of simulated artifacts (CutArt). In some instances, an advantage of CutArt includes improving the artifact localization, quality control classification performance, or a combination thereof. For example, a CutArt model learns to focus on the tissue of interest instead of the image background which beneficially improves the accuracy, reliability of the prediction performance.

Methods and systems herein may combine artifact simulation with CutArt augmentation for improving both the detection and localization performance of a DL based quality control system. In some cases, CutArt data augmentation may comprise inserting cropped regions of simulated artifacts into corresponding locations in the input image. An artifact may comprise, by way of non-limiting example, motion artifacts, radiofrequency (RF) artifacts and the like, or images with quality issues arising from hardware faults or improper imaging parameters, or a combination thereof. In some cases, an artifact patch is constrained to a tissue of interest.

Figure 5:
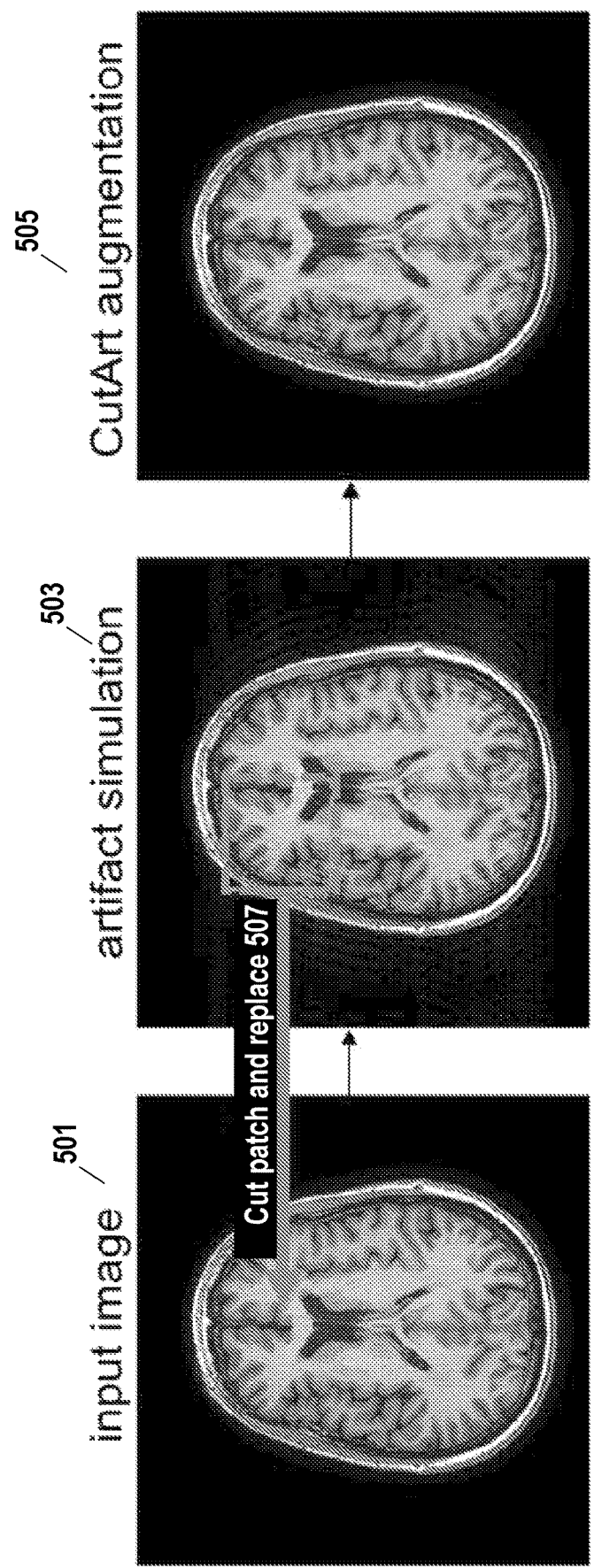
FIG. 5 shows an example of cropped patches of simulated artifacts (CutArt), in accordance with embodiments of the disclosure.

FIG. 5 shows an example of motion CutArt augmentation. A patch from an input image from an MRI scan is replaced with blurred lines 507 by applying phase shifts at random locations. For example, motion artifacts 503 may be simulated by applying phase shifts at random locations in the Fourier domain followed by an inverse Fourier transform to the image domain. The severity of the artifact may be determined by the percentage of corrupted lines. Next, a random patch from the artifact corrupted image 503 may be selected and inserting it into the corresponding location in the input image 501 to generate an image 505 (CutArt augmentation). The input image 501 may be initially assigned a ground-truth label as "pass." Once the artifact patch is incorporated into the input image 501, the augmented image 505 may be assigned a 'fail' label. Although the example shows motion artifacts, it should be noted that the CutArt methods described herein can easily be extended to other types of artifacts as described elsewhere herein.

Example

Three separate databases containing T1w (T1-weighted MRI) and T2w (T2-weighted MRI) brain images were combined. Two of the databases were publicly available: IXI1 and OpenNeuro2, and one of the databases was in-house. These databases contained images of diverse clinical indications from multiple scanner manufacturers and sites, all 3 orientations (e.g., axial, coronal, sagittal), as well as images with and without gadolinium contrast agent. The combined dataset was manually assigned pass/fail image quality scores and split into train (n=2234), validation (n=226) and test (n=426) datasets.

Motion artifacts were simulated in 2D by applying phase shifts at random locations in the Fourier domain followed by an inverse Fourier transform to the image domain. The severity of the artifact was determined by the percentage of corrupted lines. Two severity ranges: 20-30% and 30-40% of corrupted lines, were tested. The CutArt augmentation is illustrated in FIG. 5, which involved selecting a random patch from the artifact corrupted image and inserting it into the corresponding location in the input image to generate an image with a QC 'fail' label. If an artifact was introduced, then the image was assigned a 'fail' label. The patch size was selected from a uniform distribution between 30-50% of the image size.

A pre-trained 2D Resnet34 was fine-tuned for 80 epochs using an Adam optimizer and a binary cross entropy loss to predict the pass/fail QC category, as assigned by a binary 0/1, respectively. Motion simulation was performed with a probability of 0.3. CutArt was randomly performed on images with simulated motion with a probability of 0.5.

Gradient-weighted Class Activation Mapping (Grad-CAM5) was performed at inference time using the final layer of the network to generate a localization map that highlighted important regions in the image for predicting the output. The output localization maps, scaled between 0 and 1, were thresholded at 0.4 across all images to produce binary masks.

Due to class imbalance, average precision (area under the precision recall curve) was used as the evaluation metric for the QC classification task. In order to assess localization performance with respect to a known ground-truth, the Dice score was calculated on a simulated validation set. This was created by adding simulated motion artifacts to a subset of n=8 images from the validation set that passed QC.

Figure 6A:
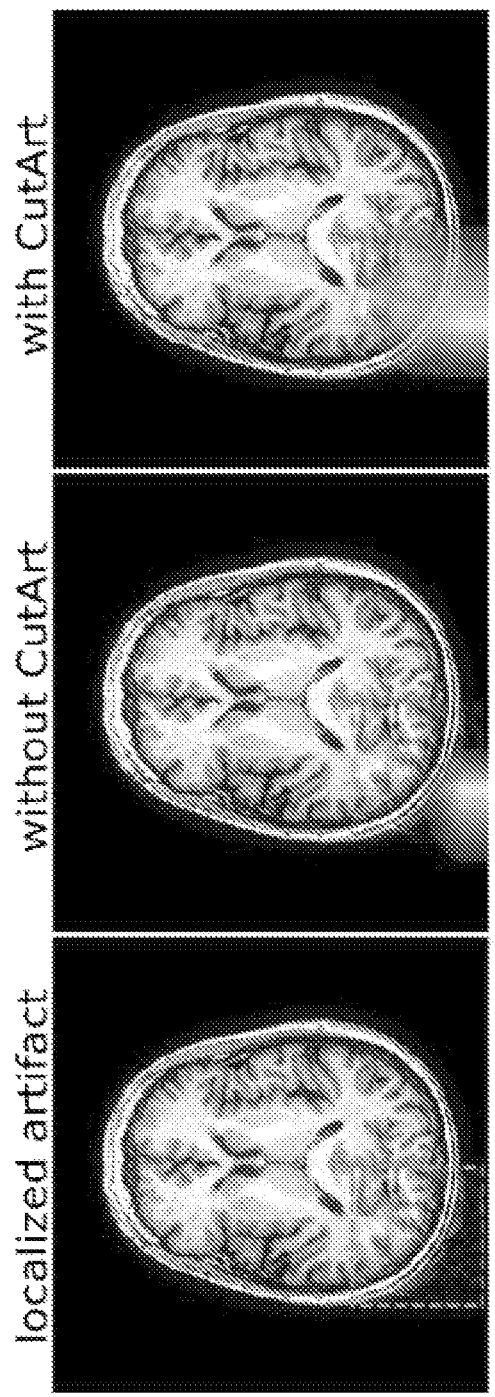
FIGS. 6A-6B shows localization performance results of models trained with CutArt.
Figure 6B:
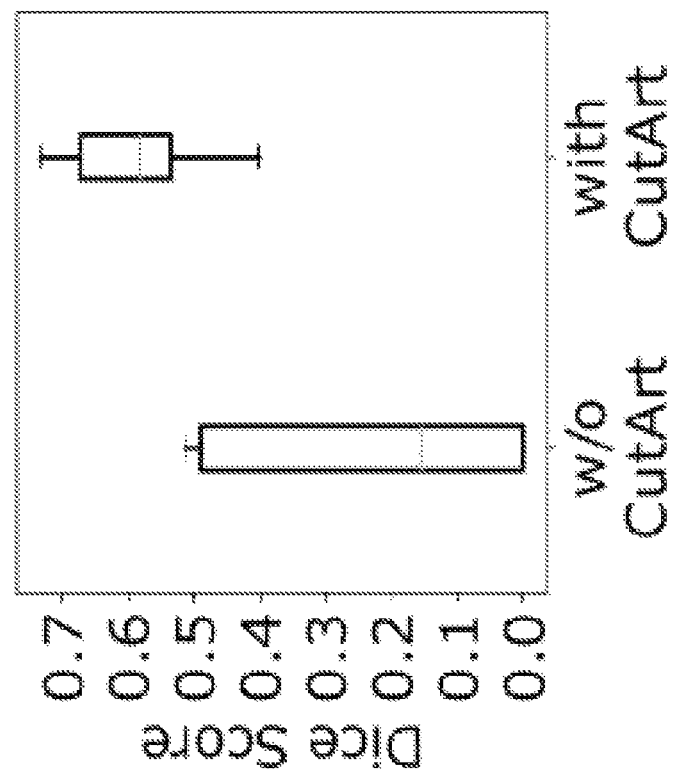

Visually, models trained with CutArt were able to localize motion artifacts well on the simulated validation dataset, as shown by GradCAM localization without and with CutArt (FIG. 6A). The ground-truth box is outlined by the dashed box. The average Dice score significantly improved from 0.23±0.08 to 0.58±0.04 (p=0.002, unpaired t-test) (FIG. 6B). Models trained without CutArt were unable to localize the simulated artifact and tended to focus more on background information rather than the foreground tissue of interest.

Figure 7A:
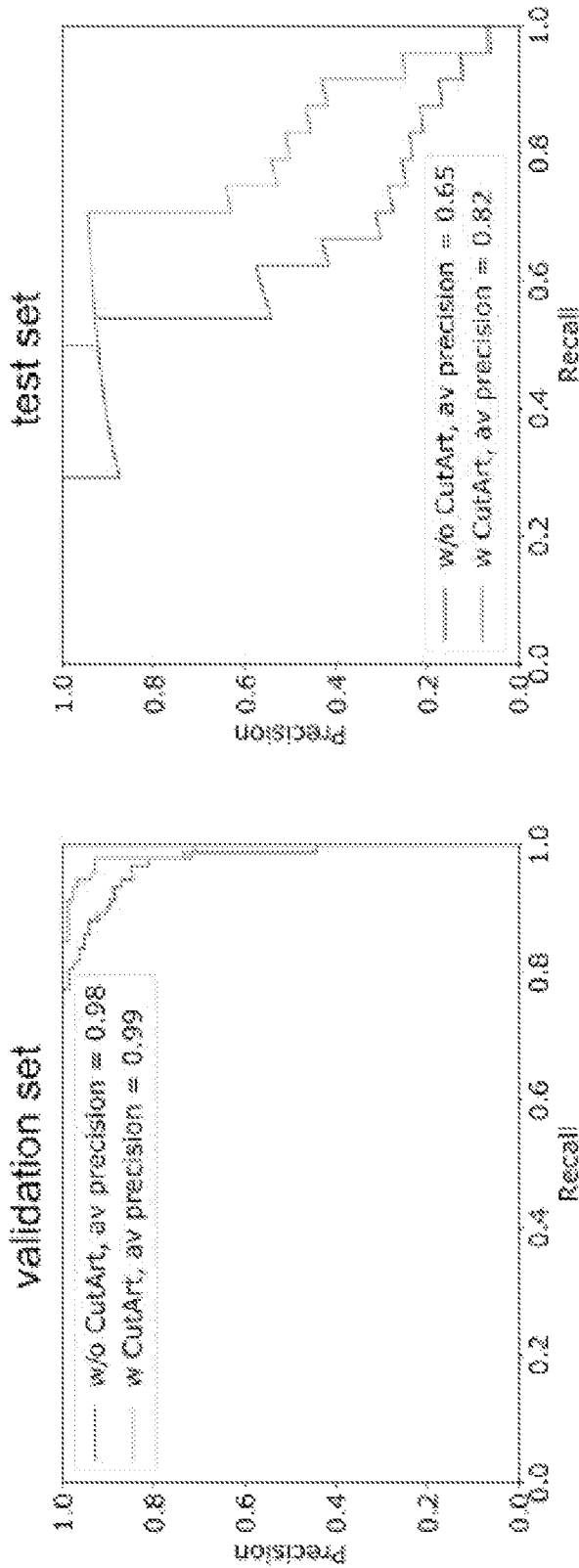
FIGS. 7A-7B shows QC classification performance results of models trained with CutArt.
Figure 7B:
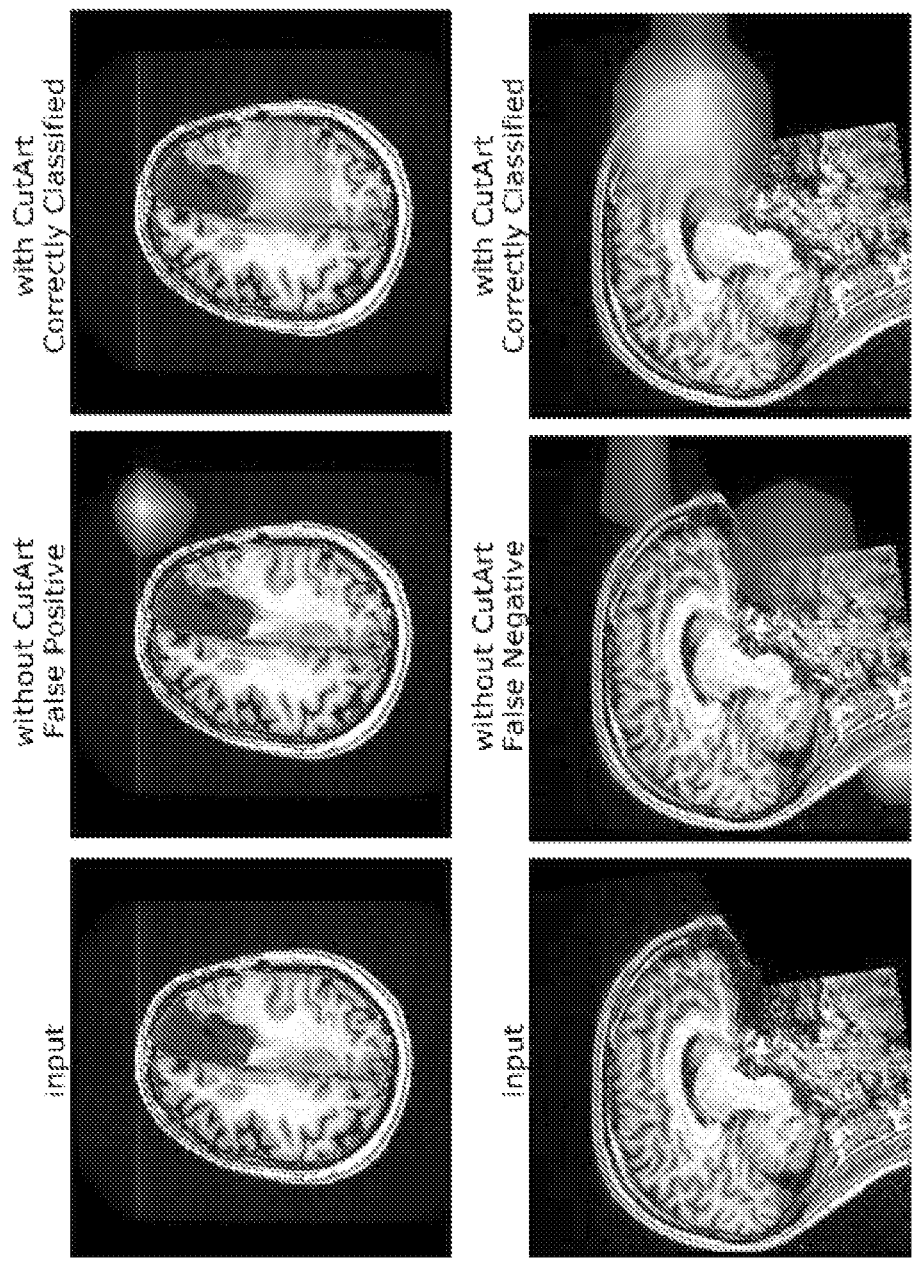

On both the validation and test sets, CutArt outperformed the model trained without CutArt with the average precision increasing from 0.98 to 0.99 on the validation set and 0.65 to 0.82 on the test set, for the 30-40% artifact severity model (FIG. 7A). It increased from 0.61 to 0.82 on the 20-30% severity model, demonstrating the effect was robust to the simulated artifact severity and indicating the improved performance was due to CutArt, and not simply because the artifact simulation parameters were unrealistic. In agreement with the simulated validation assessment, models trained without CutArt tended to focus on artifacts present in the image background rather than in the brain. GradCAM localization examples for models trained without and with CutArt are shown in (FIG. 7B). For the model trained without CutArt, GradCAM localization suggested that misclassifications sometimes occurred where the model focused too much on background artifacts. In the same cases, the model trained with CutArt classified these examples correctly and focused on artifacts within the brain tissue itself.

The results demonstrated significantly improved performance on the QC classification task by using cropped patches of motion artifact simulation instead of using entire slices. One likely explanation for the improved performance is that the model learns to pay more attention to the more important parts of the image i.e. the brain tissue rather than predominantly the background of the image, which is not always a reliable feature for determining the presence of artifacts in the input image. This explanation is also supported by the artifact localization results which tended to focus on the brain tissue itself rather than the image background. Another reason for the improved performance could be related to the prevalence of localized artifacts in real artifact affected data. More precise artifact segmentation maps could be generated using test-time augmentation and other more fine-grained localization techniques such as guided backpropagation.

In some cases, the self-supervised and multi-instance learning methods described herein enable an automated image quality framework. The automated image quality framework comprises a mechanism (e.g., image quality estimation mechanism) to determine whether the medical imaging data meet a pre-determined (e.g., satisfactory) quality. The mechanism comprises a machine learning method or deep learning method trained using the learning methods described herein. The image quality estimation mechanism may also be referred to as an image quality estimation component, image quality classifier or image quality classification component which can be used interchangeably throughout the specification. The mechanism may be capable of directly or indirectly classifying the quality of the imaging data. For example, quality of the input imaging data may be predicted or classified before image reconstruction in the acquisition domain or after reconstruction in the image domain.

The mechanism for determining the imaging data quality may be employed at any stage of an image quality control process, such as those described herein. For example, quality of the input image data may be estimated to determine whether a rescanning is needed if the quality is below a pre-determined threshold, or the quality of a processed image data (e.g., after enhancement) may be estimated to assess/evaluate the enhancement result.

In some cases, the mechanism for determining the imaging data quality may include a deep learning trained model or classifier. The output of the image quality classifier may be a quantitative indicator such as a score indicative of the quality of the imaging data, or a binary result indicating whether the quality of the imaging data meet a pre-determined quality or not (e.g., acceptable or unacceptable, pass or fail, etc.). Alternatively, the mechanism may include any suitable model for determining the image quality with or without machine learning techniques.

In some cases, the automated image quality framework or system may include a feedback mechanism for controlling the imaging apparatus. In some instances, the feedback is in real-time. In some cases, an automated image quality control system may comprise a real-time feedback mechanism providing real-time feedback about image data quality. In some cases, the real-time feedback may comprise recommended imaging parameters for the imaging device to reacquire an medical image. For example, during image acquisition or immediately after the image has been acquired, the quality control feedback mechanism may generate feedback based on the image quality result (e.g., quality score, registration quality, etc.) received from the image quality estimation component and/or the registration quality estimation component. The feedback may comprise instructions to directly adjust an operation of a scanner. For example, the instructions may instruct the scanner to perform a rescanning with one or more imaging parameters (e.g., scanning time, field of view, region-of-interest (ROI), contrast, sequence, etc.). For instance, the instruction may include reacquiring the entire image using a different sequence (e.g., a sequence that is more robust to the cause of the low-quality data) or partially reacquiring the data (e.g., in a specific ROI, with a given scanning speed) in which frequency domain lines have been affected by artifact. In some cases, the feedback may comprise a notification or suggested action delivered to a user.

Figure 8:
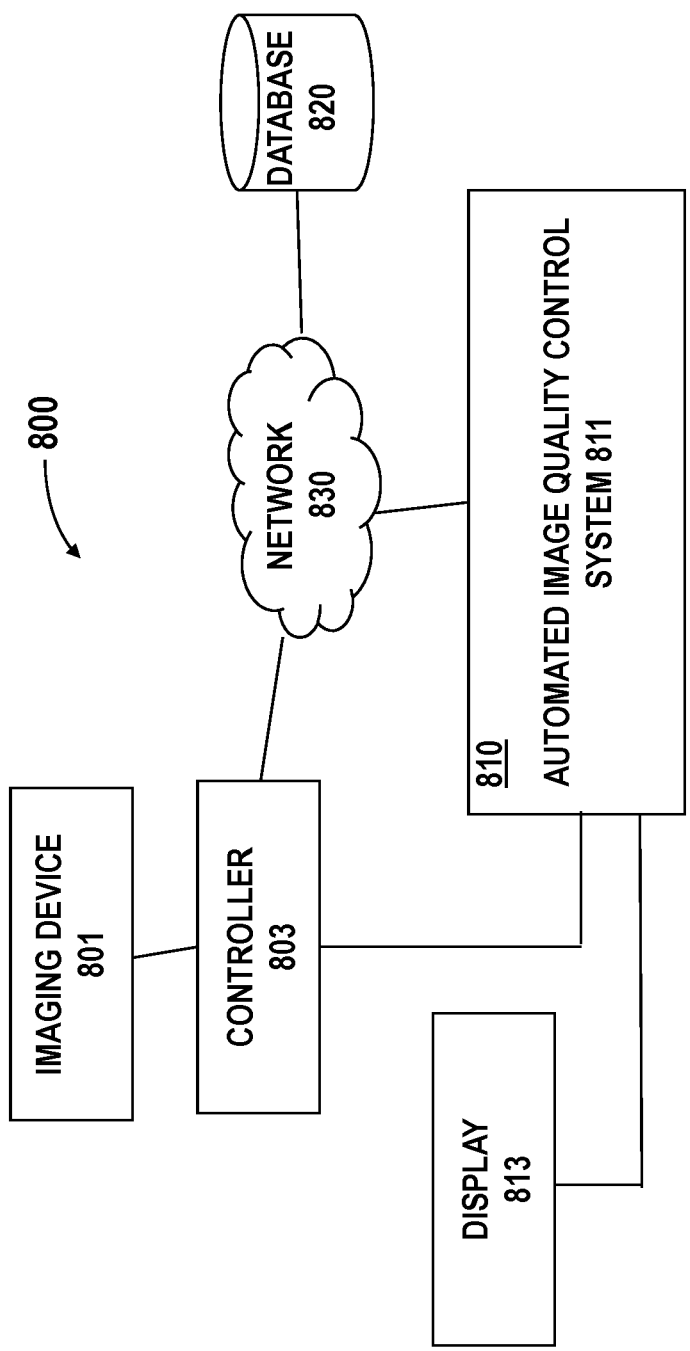
FIG. 8 schematically illustrates an automated image quality control system implemented on an imaging platform for real-time image quality control.

The systems and methods can be implemented on existing imaging systems without a need of a change of hardware infrastructure. FIG. 8 schematically illustrates an automated image quality control system 811 implemented on an imaging platform 800 for image quality control. In some cases, image quality evaluation and feedback control may be performed in real-time during acquisition. For instance, image acquisition parameters of the imaging device 801 may be adjusted in real-time as image frame being captured by the imaging device. The imaging platform 800 may comprise a computer system 810 and one or more databases 820 operably coupled to a controller 803 over the network 830. The computer system 810 may be used for implementing the methods and systems consistent with those described elsewhere herein to evaluate image quality and/or generate feedback information, for example, in real-time. The computer system 810 may be used for implementing the automated image quality control system 811. The automated image quality control system 811 can be the same as those as described elsewhere herein. Although the illustrated diagram shows the controller and computer system as separate components, the controller and computer system (at least some components of the automated image quality control system) can be integrated into a single component.

The automated image quality system may comprise or be coupled to a user interface. The user interface may be configured to receive user input and output information to a user. The user interface may output a feedback generated by the system, for example, in real-time. For example, an image quality score, detected poor alignment, out-of-distribution images or recommended actions for improving image quality may be presented to a user on the user interface. The user input may be related to controlling or setting up an image acquisition scheme when a user is presented with the feedback generated by the system. For example, the user input may indicate scan duration (e.g., the min/bed) for each acquisition, sequence, ROI or scan time for a frame that determines one or more acquisition parameters for an acquisition scheme. The user interface may include a screen 813 such as a touch screen and any other user interactive external device such as handheld controller, mouse, joystick, keyboard, trackball, touchpad, button, verbal commands, gesture-recognition, attitude sensor, thermal sensor, touch-capacitive sensors, foot switch, or any other device.

In some cases, the user interface may comprise a graphical user interface (GUI) allowing a user to select an operation mode, acquisition parameters, and view feedback information, image quality result, registration quality, OOD detection and various other information as described elsewhere herein. In some cases, the graphical user interface (GUI) or user interface may be provided on a display 813. The display may or may not be a touchscreen. The display may be a light-emitting diode (LED) screen, organic light-emitting diode (OLED) screen, liquid crystal display (LCD)

screen, plasma screen, or any other type of screen. The display may be configured to show a user interface (UI) or a graphical user interface (GUI) rendered through an application (e.g., via an application programming interface (API) executed on the local computer system or on the cloud). The display may be on a user device, or a display of the imaging system.

The imaging device 801 may acquire image frames using any suitable imaging modalities live video or image frames may be streamed in using any medical imaging modality such as but not limited to CT, fMRI, SPECT, PET, ultrasound, etc. Image quality of the captured live video or image data stream may be degraded due to, for example, low temporal resolution or reduction in radiation dose or presence of noise in imaging sequence. The captured video stream may be low-quality such as low image resolution, low temporal resolution, low contrast, or low signal to noise ratio (SNR).

The controller 803 may be in communication with the imaging device 801, one or more displays 813 and the automated image quality control system 811. For example, the controller 803 may be operated to provide the controller information to manage the operations of the imaging system, according to installed software programs. The controller 803 may be coupled to the real-time feedback component of the automated image quality control system to adjust the one or more operation parameters of the imaging device based on the real-time feedback.

The controller 803 may comprise or be coupled to an operator console which can include input devices (e.g., keyboard) and control panel and a display. For example, the controller may have input/output ports connected to a display, keyboard and other I/O devices. In some cases, the operator console may communicate through the network with a computer system that enables an operator to control the production and display of live video or images on a screen of display. The image frames displayed on the display may be processed by the automated image quality control system 811 and have improved quality.

The automated image quality control system 811 may comprise multiple components as described above. For example, automated image quality control system 811 may comprise a mechanism to ensure medical imaging data meet a pre-determined (e.g., satisfactory) quality, a mechanism for controlling the quality of image registration (e.g., alignment), a feature that prevents the return of unexpected or unacceptable outputs from the image data processing system due to uncertainty estimations generated by the automated image quality control system, a mechanism enabling an imaging device (e.g., scanner) specific or site-specific calibration of the quality control procedure, and/or a feature of real-time feedback control of the scanner based on the real-time image quality information. In some embodiments, the automated image quality control system may also comprise a training module configured to develop and train a deep learning framework using training datasets. In some cases, the automated image quality control system may further be configured for continual training, generating and preparing training datasets, and managing deep learning models.

The training module may be configured to train a deep learning model. In some embodiments, the training module may be configured to train a plurality of deep learning models for estimating the image quality, registration quality with the capability to automatically adapt to different sites, devices, quality standards, or other conditions. The training module may train the plurality of deep learning models individually. Alternatively or in addition to, the plurality of deep learning models may be trained as an integral model.

The training module may be configured to generate and manage training datasets. For example, the training datasets for training the classifier for image quality or registration quality estimation may comprise pairs of poor (unacceptable) quality images and high quality (acceptable) images, pairs of poorly aligned images and well aligned images.

The training module may be configured to train classifier for estimating image quality or registration quality. For example, the training module may employ supervised training, unsupervised training or semi-supervised training techniques for training the model. The training module may be configured to implement the machine learning methods as described elsewhere herein. The training module may train a model off-line. Alternatively or additionally, the training module may use real-time data as feedback to refine the model for improvement or continual training.

The deep learning model can employ any type of neural network model, such as a feedforward neural network, radial basis function network, recurrent neural network, convolutional neural network, deep residual learning network and the like. In some embodiments, the machine learning algorithm may comprise a deep learning algorithm such as convolutional neural network (CNN). The model network may be a deep learning network such as CNN that may comprise multiple layers. For example, the CNN model may comprise at least an input layer, a number of hidden layers and an output layer. A CNN model may comprise any total number of layers, and any number of hidden layers. The simplest architecture of a neural network starts with an input layer followed by a sequence of intermediate or hidden layers, and ends with output/final layer. The hidden or intermediate layers may act as learnable feature extractors, while the output layer may output a scalar classification score or regression score. Each layer of the neural network may comprise a number of neurons (or nodes). A neuron receives input that comes either directly from the input data (e.g., low quality image data, multiple images from same subject, etc.) or the output of other neurons, and performs a specific operation, e.g., summation. In some cases, a connection from an input to a neuron is associated with a weight (or weighting factor). In some cases, the neuron may sum up the products of all pairs of inputs and their associated weights. In some cases, the weighted sum is offset with a bias. In some cases, the output of a neuron may be gated using a threshold or activation function. The activation function may be linear or non-linear. The activation function may be, for example, a rectified linear unit (ReLU) activation function or other functions such as saturating hyperbolic tangent, identity, binary step, logistic, arcTan, softsign, parameteric rectified linear unit, exponential linear unit, softPlus, bent identity, softExponential, Sinusoid, Sinc, Gaussian, sigmoid functions, or any combination thereof.

In some cases, the automated image quality framework or system may include a real-time feedback mechanism for controlling the imaging hardware (e.g., scanner). For example, when the input imaging data is determined below a quality threshold (e.g., by the imaging data quality evaluation mechanism) or is detected to be out-of-distribution of the training datasets, the real-time feedback control mechanism may generate an instruction to the scanner to reacquire the image data using a different imaging protocol, adjusting one or more imaging parameters, or issue a warning or suggestion to a user to take appropriate action.

The computer system 810 may be programmed or otherwise configured to implement the one or more components of the automated quality control system 811. The computer system 810 may be programmed to implement methods consistent with the disclosure herein.

The imaging platform 800 may comprise computer systems 810 and database systems 820, which may interact with the automated quality control system 811. The computer system may comprise a laptop computer, a desktop computer, a central server, distributed computing system, etc. The processor may be a hardware processor such as a central processing unit (CPU), a graphic processing unit (GPU), a general-purpose processing unit, which can be a single core or multi core processor, or a plurality of processors for parallel processing. The processor can be any suitable integrated circuits, such as computing platforms or microprocessors, logic devices and the like. Although the disclosure is described with reference to a processor, other types of integrated circuits and logic devices are also applicable. The processors or machines may not be limited by the data operation capabilities. The processors or machines may perform 512 bit, 256 bit, 128 bit, 64 bit, 32 bit, or 16 bit data operations.

The computer system 810 can communicate with one or more remote computer systems through the network 830. For instance, the computer system 810 can communicate with a remote computer system of a user or a participating platform (e.g., operator). Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 810 or the automated quality control system via the network 830.

The imaging platform 800 may comprise one or more databases 820. The one or more databases 820 may utilize any suitable database techniques. For instance, structured query language (SQL) or "NoSQL" database may be utilized for storing image data, collected raw data, image quality result, registration result, enhanced image data, training datasets, trained model (e.g., hyper parameters), user specified parameters (e.g., window size), etc. Some of the databases may be implemented using various standard data-structures, such as an array, hash, (linked) list, struct, structured text file (e.g., XML), table, JSON, NOSQL and/or the like. Such data-structures may be stored in memory and/or in (structured) files. In another alternative, an object-oriented database may be used. Object databases can include a number of object collections that are grouped and/or linked together by common attributes; they may be related to other object collections by some common attributes. Object-oriented databases perform similarly to relational databases with the exception that objects are not just pieces of data but may have other types of functionality encapsulated within a given object. If the database of the present disclosure is implemented as a data-structure, the use of the database of the present disclosure may be integrated into another component such as the component of the present disclosure. Also, the database may be implemented as a mix of data structures, objects, and relational structures. Databases may be consolidated and/or distributed in variations through standard data processing techniques. Portions of databases, e.g., tables, may be exported and/or imported and thus decentralized and/or integrated.

The network 830 may establish connections among the components in the imaging platform and a connection of the imaging system to external systems. The network 830 may comprise any combination of local area and/or wide area networks using both wireless and/or wired communication systems. For example, the network 830 may include the Internet, as well as mobile telephone networks. In one embodiment, the network 830 uses standard communications technologies and/or protocols. Hence, the network 830 may include links using technologies such as Ethernet, 802.11, worldwide interoperability for microwave access (WiMAX), 2G/3G/4G/5G mobile communications protocols, asynchronous transfer mode (ATM), InfiniBand, PCI Express Advanced Switching, etc. Other networking protocols used on the network 830 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), and the like. The data exchanged over the network can be represented using technologies and/or formats including image data in binary form (e.g., Portable Networks Graphics (PNG)), the hypertext markup language (HTML), the extensible markup language (XML), etc. In addition, all or some of links can be encrypted using conventional encryption technologies such as secure sockets layers (SSL), transport layer security (TLS), Internet Protocol security (IPsec), etc. In another embodiment, the entities on the network can use custom and/or dedicated data communications technologies instead of, or in addition to, the ones described above.

As described above, the automated image quality framework or system may include a mechanism that can account for the difference between deployment sites, systems (e.g., scanners), tasks, users and the like. The mechanism may perform scanner-specific, site-specific, and/or task-specific calibration to adapt to different quality standards arising out of the different sites, scanners, users or tasks as described above.

As different imaging devices can produce different quality images and/or the quality of a medical image can be task dependent, a calibration capability is critical to ensure that the sensitivity of the quality control system is well adjusted to various applications and deployment conditions. In some cases, the calibration feature may be implemented based on user feedback. For example, user feedback may be requested to generate image quality labels. For instance, when images are flagged as low quality by the system, a user may provide input indicating whether the image quality is low quality or is actually satisfactory for the given goal or task thereby adjusting the sensitivity of the system to the given task.

Alternatively or additionally, the calibration feature may be implemented automatically without user interaction. For example, the system may adjust image quality labels based on the quality metrics from downstream processing such as by assessing the image registration quality or segmentation quality using the classifiers as described elsewhere herein. For instance, based on the image registration quality, the image quality labels may be adjusted to distinguish between different scanner types, sites and/or tasks. In some cases, after a database of scanner specific or task-specific labels has been built up, the model can be further recalibrated using methods such as Platt scaling or histogram binning based methods as new data are available or upon a change in the scanners, sites, tasks or desired goals.

The automated image quality framework or system herein may comprise any one or more of the abovementioned features, mechanisms and components or a combination thereof. Any one of the aforementioned components or mechanisms can be combined with any other components. The one or more of the abovementioned features, mechanisms and components can be implemented as a standalone component or implemented as an integral component.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A computer-implemented method for automated image quality control (QC), the method comprising:
    generating training data based at least in part on metadata obtained from a data augmentation process; and
    training a model for a QC task based at least in part on the training data, wherein the QC task comprises an out-of-distribution (OOD) detection,
    wherein the model is trained using a self-supervised learning algorithm and is trained to predict metadata from an input image and
    i) wherein an OOD event is determined when the predicted metadata does not match the metadata or
    ii) wherein an OOD event is determined when an uncertainty score of the metadata prediction is beyond a predetermined threshold.

2. The computer-implemented method of claim 1, wherein supervised learning algorithm is contrastive learning.

3. The computer-implemented method of claim 1, wherein the metadata is extracted from a header of an image.

4. The computer-implemented method of claim 3, wherein the metadata is used to generate a label for the image.

5. The computer-implemented method of claim 1, wherein the QC task is image registration quality control.

6. The computer-implemented method of claim 5, wherein the model is trained to predict an alignment based on a similarity map between embeddings of two input images.

7. The computer-implemented method of claim 6, wherein the embeddings are local embeddings or global embeddings produced by an encoder-decoder network.

8. A computer-implemented method for automated image quality control (QC), the method comprising:
    generating training data based at least in part on metadata obtained from a data augmentation process, wherein the data augmentation process comprises generating cropped patch with simulated artifact; and
    training a model for a QC task based at least in part on the training data, wherein the model is trained using a self-supervised learning algorithm.

9. The computer-implemented method of claim 8, further comprising replacing a corresponding patch in an input image with the cropped patch with the simulated artifact.

10. A computer-implemented method for automated image quality control (QC), the method comprising:
    generating training data based at least in part on metadata obtained from a data augmentation process, wherein the training data comprises 3D image including a stack of slices and wherein generating the training data comprises generating a label for the 3D image using a multiple-instance-learning method; and
    training a model for a QC task based at least in part on the training data, wherein the model is trained using a self-supervised learning algorithm.

11. The computer-implemented method of claim 10, further comprising determining a pooling strategy for combining embeddings of one or more slices based on a selected multiple-instance-learning assumption.

* * * * *